United States Patent

Kumar et al.

[11] Patent Number: 6,023,137
[45] Date of Patent: Feb. 8, 2000

[54] USE OF TRACTION INVERTER FOR SUPPLYING POWER FOR NON-TRACTION APPLICATIONS

[75] Inventors: Ajith Kuttannair Kumar; Ronald Francis Griebel, both of Erie, Pa.

[73] Assignee: General Electric Company, Erie, Pa.

[21] Appl. No.: 09/134,117

[22] Filed: Aug. 14, 1998

Related U.S. Application Data

[63] Continuation-in-part of application No. 08/942,454, Oct. 1, 1997, abandoned.

[51] Int. Cl.$^7$ .............................. H02P 5/40; H02P 7/66; H02P 6/00; F02D 41/14; F02D 17/02
[52] U.S. Cl. .................... 318/254; 318/139; 318/712; 318/719; 318/723; 123/352; 123/357; 123/481
[58] Field of Search ....................... 318/138, 139, 318/254, 712, 719, 723, 701, 721; 322/20, 28, 36; 123/198 D, 352, 357, 478, 481, 198 F, 41.13; 363/21; 364/424.01

[56] References Cited

U.S. PATENT DOCUMENTS

| | | |
|---|---|---|
| 3,707,659 | 12/1972 | Appelo . |
| 4,592,323 | 6/1986 | Vest ......................................... 123/362 |
| 4,616,166 | 10/1986 | Cooper et al. ........................... 318/712 |
| 4,634,887 | 1/1987 | Baich et al. ................................ 290/3 |
| 4,665,319 | 5/1987 | Seepe et al. ................................ 290/3 |
| 4,698,761 | 10/1987 | Cooper et al. ........................... 364/424 |
| 4,967,334 | 10/1990 | Cook et al. . |
| 5,418,437 | 5/1995 | Couture et al. ......................... 318/139 |
| 5,506,484 | 4/1996 | Munro et al. ............................ 318/599 |
| 5,512,811 | 4/1996 | Latos et al. . |
| 5,528,445 | 6/1996 | Cooke et al. . |
| 5,561,602 | 10/1996 | Bessler et al. ...................... 364/424.01 |
| 5,627,758 | 5/1997 | Lansberry et al. ....................... 364/481 |
| 5,642,270 | 6/1997 | Green et al. ............................... 363/21 |
| 5,691,625 | 11/1997 | Kumar et al. ........................... 318/721 |
| 5,826,563 | 10/1998 | Patel et al. .............................. 123/481 |
| 5,901,683 | 5/1999 | Patel ........................................ 123/352 |

*Primary Examiner*—Paul Ip
*Attorney, Agent, or Firm*—Jill M. Breedlove; Douglas E. Stoner

[57] ABSTRACT

A method and apparatus for cranking of an internal combustion engine in an AC electric traction motor propelled vehicle using inverters normally coupled to supply power to each of a plurality of AC motors. The inverters have DC input terminals connected between a relatively positive DC bus and a relatively negative DC bus and the DC buses are connected to DC output terminals of a rectifier. The rectifier has AC input terminals connected to stator terminals of a synchronous generator. The generator includes a field winding and a rotor connected in driving relationship to a crank shaft of the engine. The vehicle further includes switching apparatus for selectively connecting a battery to the positive and negative DC buses and for disconnecting at least one of the inverters from the AC motor and connecting the at least one of the inverters to supply power to the generator such that the at least one of the inverters is operable to energize the generator whereby the generator operates in a motoring mode to rotate the engine crank shaft to start the engine. Another of the inverters is separately connectable to a pre-lube pump motor for effecting lubrication of the engine prior to starting the engine. After lubricating and starting of the engine, the switch reconnects the inverters to supply AC electric power to respective traction motors of the vehicle.

8 Claims, 5 Drawing Sheets

USE OF TRACTION INVERTER FOR SUPPLYING POWER FOR NON-TRACTION APPLICATIONS

CROSS-REFERENCE TO RELATED APPLICATIONS

This application is a continuation-in-part of U.S. patent application Ser. No. 08/942,454, filed Oct. 1, 1997, now abandoned.

BACKGROUND OF THE INVENTION

This invention relates generally to electrical propulsion systems for diesel electric vehicles such as locomotives equipped with alternating current (AC) electric traction motors and, more particularly, to a method and apparatus for using a traction inverter to supply AC electric power for non-traction motor applications.

In a conventional diesel electric locomotive, a thermal prime mover (typically a 16 cylinder turbo-charged diesel engine) is used to drive an electrical transmission comprising a synchronous generator that supplies electric current to a plurality of alternating current (AC) traction motors whose rotors are drivingly coupled through speed reducing gearing to respective axle wheel sets of the locomotive. The generator typically comprises a main three-phase traction alternator, the rotor of which is mechanically coupled to the output shaft of the diesel engine. When excitation current is supplied to field windings on the rotating rotor, alternating voltages are generated in three-phase armature windings on the stator of the alternator. These voltages are rectified to produce a controlled amplitude DC voltage and then applied to one or more PWM (pulse width modulation) inverters which control the effective frequency of alternating current to be supplied to the armature windings of the AC traction motors. The effective AC excitation frequency produced by the inverters controls the speed of the AC motors with power being controlled by pulse width modulation of the AC waveform.

Prior to starting of these very high horsepower diesel engines, it is common practice to initiate a pre-lube of the engine by actuating a lubrication drive pump to force lubricant through the engine. The pump is driven by a three-phase, AC electric motor. The motor is powered from the vehicle battery using a DC-to-DC converter to obtain voltage magnitude followed by a three-phase inverter to convert the DC voltage to a fixed frequency, three-phase excitation for the pump motor. This system has several disadvantages, most notable of which is the added cost of a power DC-to-DC converter and a three-phase power inverter. A secondary disadvantage is that a single failure of either the converter or inverter will preclude operation of the locomotive. Accordingly, it would be advantageous to provide a method and apparatus for powering a pre-lube system which does not require dedicated power converters and inverters.

At initial start-up of the locomotive after the pre-lube operation discussed above, the on-board battery is also used to provide electrical power for cranking of the diesel engine. Typically, the battery is connected to supply DC power to a cranker inverter and the inverter is operated to convert the DC power to controlled frequency AC power. The cranker inverter is switched into circuit with the synchronous generator and the generator is operated as a motor to turn the output shaft of the engine for cranking.

The cranker inverter is typically a current-fed, third harmonic, auxiliary impulse inverter for supplying the variable frequency alternating current to the 3-phase stator windings of the rotatable synchronous generator that is used to start or "crank" the diesel engine, i.e., the generator is operated as a motor and the rotor of the generator is coupled to the crankshaft of the engine to rotate the crankshaft for starting. Initially the output torque of the rotor (and hence the magnitude of current in the stator windings) needs to be relatively high in order to start turning the crankshaft. As the rotor accelerates from rest, less torque (and current) will be required, while the fundamental frequency of load current increases with speed (revolutions per minute). In its cranking mode of operation, the inverter supplies the machine with current of properly varying magnitude and frequency until the engine crankshaft is rotating at a rate that equals or exceeds the minimum speed at which normal running conditions of the engine can be sustained.

In essence, a third harmonic auxiliary impulse commutated inverter comprises six main unidirectional conduction controllable electric valves, such as thyristors, that are interconnected in pairs of series aiding, alternately conducting valves to form a conventional 3-phase, double-way, 6-pulse bridge between a pair of DC terminals and a set of three AC terminals. The DC terminals of the bridge are adapted to be connected to the on-board locomotive battery. The AC terminals of the aforesaid bridge are respectively connected to the different phases of a 3-phase electric load circuit which typically comprises the star-connected 3-phase stator windings of the generator.

To supply the load circuit with 3-phase alternating current, the six main valves of the inverter are cyclically turned on (i.e., rendered conductive) in a predetermined sequence in response to a family of "firing" signals (gate pulses) that are periodically generated in a prescribed pattern and at desired moments of time by associated control means. To periodically turn off the main valves by forced commutation, the inverter is provided with an auxiliary circuit comprising a pre-charged commutation capacitor and at least seventh and eighth alternately conducting unidirectional controllable electric valves that are arranged to connect the capacitor between the neutral or common point of the 3-phase AC load circuit and either one of the DC terminals of the bridge. Once the engine has been "cranked", the inverter is disconnected from the system and is not used until the engine is again started. Accordingly, it would be desirable to eliminate the need for a separate inverter for cranking on the engine and further desirable to provide a controllable frequency power source that is less complicated than the third harmonic, auxiliary impulse commutated inverter.

SUMMARY OF THE INVENTION

In an exemplary form, the invention is illustrated in a locomotive having at least one alternating current (AC) electric traction motor and at least one power inverter having output terminals connected in circuit with the motor for supplying controlled frequency power to the motor. The inverter includes a plurality of controllable electric valves for supplying controlled frequency electric power to the motor by inversion of direct current (DC) power supplied to input terminals of the inverter. The DC power is obtained from rectification of AC power generated at armature winding terminals of an alternator having an armature connected to be rotatably driven by an internal combustion engine. The locomotive includes a battery for supplying power for cranking of the engine. Switching apparatus is provided for coupling the input terminals of the at least one inverter in electric circuit arrangement for receiving DC electric power from the battery. When the inverter is connected to the battery, the switch apparatus in a first position couples the output terminals of the inverter to an electric motor connected for driving a lubrication pump. In a second position, the switch couples the output terminals of the inverter to respective ones of the armature winding terminals of the alternator. In a third position, the switch couples the output terminals to excitation windings of the AC electric traction motor. In a first mode, the electric valves of the inverter are energized to supply AC excitation to the lubrication pump motor to perform prelubrication of the diesel engine prior to cranking. In a second mode with the switch in the second position, the inverter valves are energized to supply variable frequency excitation to the alternator armature windings for effecting rotation of the alternator and concurrent rotation of the drive shaft of the engine for cranking of the engine. Finally, in a third mode with the switch in the third position and the diesel engine running, the inverter is operated to supply traction power to the AC traction motors of the vehicle. In this manner, the inverter which normally supplies controlled frequency power to motors of the locomotive is reconnected before and during cranking to supply controlled frequency first to the pre-lube pump motor and then power to the alternator until the engine has been cranked. After cranking of the engine, the inverter is reconnected in its normal configuration for receiving rectified power from the alternator and for supplying controlled frequency AC power to motors of the locomotive. Preferably, the electric valves of the inverter are gate turn-off switching devices thus eliminating the third harmonic switching characteristics of the prior art.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
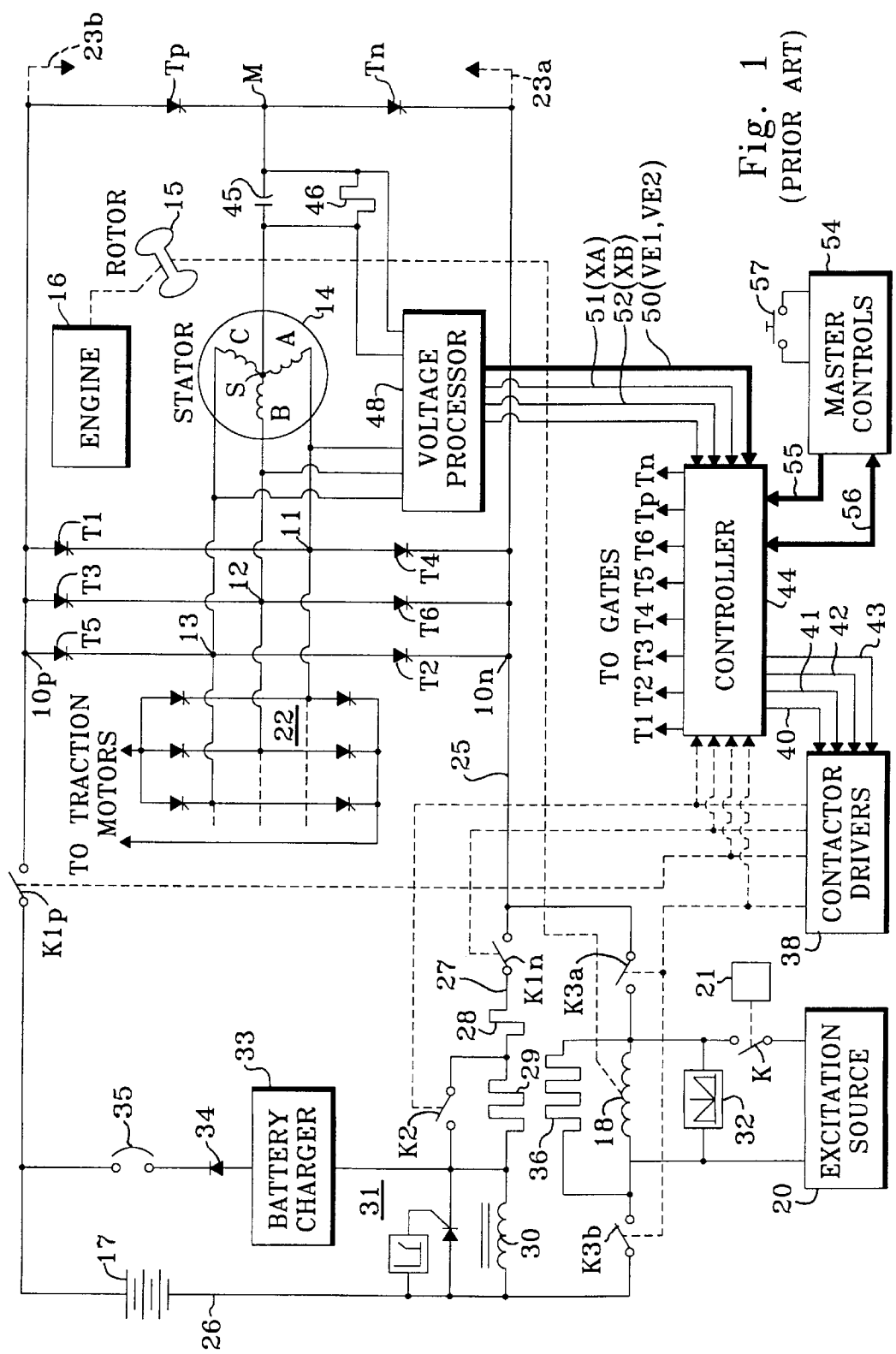
FIG. 1 is a simplified diagram of a typical prior art power system for a diesel electric locomotive.

The electric power system shown in FIG. 1 comprises a third harmonic auxiliary impulse commutated inverter having a pair of DC terminals 10p and 10n connected to a source of relatively smooth direct current and a set of three AC terminals 11,12, and 13 connected, respectively, to line terminals of three star-connected armature windings on the stator of a rotatable, variable speed, 3-phase AC synchronous machine 14, sometimes referred to herein as a traction alternator, which has a rotor 15 that is mechanically coupled to a prime mover 16. The current source for the inverter comprises the combination of a source of voltage, such as a heavy duty electric storage battery 17, in series with impedance means which has appreciable electrical inductance, preferably provided by the DC field winding 18 on the rotor 15 of the machine 14. By way of example, the battery 17 is a lead-acid or nickel-cadmium type having 32 cells and rated 68 volts, and the average magnitude of voltage at its terminals normally does not exceed 76 volts. Its internal resistance is typically in the range of 16 to 37 milliohms. The battery is intended to supply electric energy for starting the prime mover, and the system shown in FIG. 1 can successfully perform this function with the battery voltage as low as 61 volts.

The prime mover 16 can be a conventional thermal or internal-combustion engine such as a high-horsepower, 16-cylinder diesel engine that is used to provide the motive power on a large self-propelled diesel-electric traction vehicle such as a locomotive. The synchronous machine 14 has dual modes of operation: as a generator for supplying alternating current to an electric load circuit that is connected to its stator windings, and as an AC motor for cranking or starting the engine 16. In its generating mode, the rotor 15 of the machine is driven by the crankshaft of the engine 16, and the field winding 18 is energized by a suitable excitation source 20 (e.g., the rectified output of auxiliary windings on the stator of the machine 14) to which it is connected by means of a suitable contactor K which is closed by a conventional actuating mechanism 21 on command. The machine 14 now generates alternating voltages at the line terminals of its 3-phase stator windings. The rms magnitude of the fundamental sinusoidal components of these voltages depends on the angular velocity (rpm) of the rotor and on the amount of field excitation. The generated voltages are applied to AC input terminals of at least one 3-phase, double-way rectifier bridge 22, and the rectified electric power at the output terminals of each such bridge is supplied to positive and negative DC buses for distribution to traction motors (not shown) of the vehicle. As is shown in FIG. 1, the bridge 22 comprises simple solid-state diodes, but alternatively it could be a controlled rectifier if desired. As is suggested by the broken lines 23a and 23b, multiple traction motors (not shown) could be connected to receive power from the DC terminals 10p and 10n if desired.

In the engine starting mode of operation, the rotor 15 of the synchronous machine 14 drives the crankshaft of the engine 16. Now electric energy is supplied from the battery 17 to the windings on both the rotor and the stator of the machine, and the rotor 15 exerts torque to turn the crankshaft and thereby crank the engine. As the rotor accelerates from rest, both the frequency and the rms magnitude of the fundamental alternating voltage waveforms developed at the line terminals of the stator windings (i.e., the back emf) correspondingly increase, while load current (i.e., current in the field and armature windings) decreases in magnitude. Once the rotor is rotating faster than a predetermined rate, which typically is 240 rpm, the engine is presumed to be started and the engine cranking mode of operation is discontinued. Assuming that the machine 14 has ten poles, 240 rpm corresponds to a fundamental frequency of 20 Hertz. Thus the fundamental frequency of alternating current supplied to the stator windings of the machine 14 needs to increase from 0 to approximately 20 Hz in order for the illustrated system to perform its engine starting function.

The third harmonic auxiliary impulse commutated inverter is operative to convert direct current from the battery 17 into variable frequency alternating currents in the three different phases A, B, and C of the 3-phase armature windings on the stator of the machine 14. The inverter has at least three pairs of alternately conducting main controllable electric valves interconnected and arranged in a 3-phase, double-way bridge configuration between the set of three AC terminals 11, 12 and 13 and the pair of DC terminals 10p and 10n. More particularly, a first pair of valves T1 and T4 are connected in series aiding fashion from terminal 10p to terminal 10n, and their juncture, comprising terminal 11, is connected to phase A of the stator windings; a second pair of valves T3 and T6 are connected in series aiding fashion from 10p to 10n, and their juncture, comprising terminal 12, is connected to phase B of the stator windings; and a third pair of valves T5 and T2 are connected in series aiding fashion from 10p to 10n, and their juncture, comprising terminal 13, is connected to phase C. Each valve preferably comprises at least one solid state unidirectional controlled rectifier popularly known as a thyristor. It has a turned on (conducting) state and a turned off (non-conducting) state. In practice the valves are respectively shunted by conventional snubber circuits (not shown). The illustrated means for connecting the DC terminals 10p and 10n of the inverter to the battery 17 will next be described in more detail.

The first DC terminal 10p is connected to the relatively positive terminal of the battery 17 via a single pole contactor K1p, and the second DC terminal 10n is connected to the other terminal of the battery by means of a conductor 25, one pole K3a of a double-pole contactor K3, the field winding 18, the other pole K3b of the same contactor, and a conductor 26. The field winding 18 typically has a resistance in the range of 0.12 to 0.28 ohm and an unsaturated inductance of more than 0.3 henry. A single-pole contactor K1n, a conductor 27, and resistance means comprising two resistors 28 and 29 are connected in parallel circuit relationship with the field winding 18 in the load current path between conductors 25 and 26. The resistors 28 and 29 are in series, and both have very low ohmic values; for example, the resistance of resistor 28 is approximately 14 milliohms and the resistance of resistor 29 is approximately 23 milliohms. The second resistor 29 is shunted by another single-pole contactor K2 which, when closed, reduces the ohmic value of the resistance means to that of the first resistor 28 alone.

An inductor 30 of approximately one millihenry inductance is connected in series with resistors 28 and 29 between the second resistor 29 and the conductor 26 to smooth the current flowing in this branch of the load current path. The inductor 30 is shunted by a conventional overvoltage protective device 31, the resistance of which is normally very high but automatically decreases to a negligible amount in substantially instantaneous response to the magnitude of voltage across the inductor rising to a predetermined breakover level (e.g., 750 volts). A similar protective device 32 with bidirectional response is connected across the field winding 18. A resistor 36 of significant ohmic value (e.g., 100 ohms) is also connected across the winding 18 to enable thyristor "latching" current to bypass the field and the inductor 30 when battery current starts flowing to precharge the inverter's commutation capacitor.

As is shown in FIG. 1, a battery charger 33, in series with a blocking diode 34 and a circuit breaker 35, is connected across the combination of battery 17 and inductor 30. With the engine 16 running under steady-state conditions, the battery charger holds the battery voltage at approximately 74 volts. It can be energized from any suitable source, such as auxiliary windings (not shown) on the stator of the synchronous machine 14.

With the field winding 18 in the load current path during engine cranking, the synchronous machine 14 will operate with a characteristic similar to that of a series DC motor, namely, high current and hence desirably high starting torque at low speeds. The resistance means 28,29 in parallel with the field reduces the ohmic value of resistance that the field winding alone would otherwise introduce in this path, thereby initially allowing a higher magnitude of armature current and later, as speed increases, providing automatic field weakening which permits the machine to run at a higher speed. Initially load current is limited by the integral resistance of the battery 17 as well as other resistance in its path and as speed increases it is limited by the back emf of the armature (i.e., stator) windings. Thus, load current and torque tend to decrease with increasing speed. A short time after cranking commences, the contactor K2 is closed to further reduce the amount of resistance in parallel with the field, thereby permitting more load current to flow and hence more torque to be developed at higher speeds compared to the quantities that would be achieved if the parallel resistance were not so reduced.

When the cranking mode of operation commences, the contactor K4 is open, and all of the contactors in the load current path between the battery 17 and the DC terminals 10p and 10n are closed except K2. In a manner that will soon be explained, contactor K2 is commanded to close upon the expiration of a predetermined length of time after cranking commences. Thereafter, in response to the speed of the engine attaining a threshold (e.g., 240 rpm) that marks the conclusion of cranking and therefore the successful starting of the engine 16, all of the previously closed contactors are opened. Upon opening contactor K3 the field winding 18 is disconnected from the load current path between the conductors 25 and 26, and the contactor K4 is then closed by its actuating mechanism 21 in order to reconnect the field to the normal excitation source 20.

Each of the four contactors K1p, K1n, K2, and K3 has an associated actuating mechanism that determines its closed or open status. All four such mechanisms are represented in FIG. 1 by a single block 38 labeled "Contactor Drivers," and they respectively respond to opening/closing signals received over lines 40,41,42, and 43 from another block 44 labeled "Controller." The controller 44 knows the actual status of each contactor by virtue of feedback signals that it receives from conventional position indicators (not shown) that are associated with the separable contact members of the respective contactors, as represented symbolically by broken lines in FIG. 1.

In order to turn on each of the controllable valves T1 through T6 in the inverter, an appropriate signal is applied to the associate gate while the main electrodes of that valve are forward biased (i.e., anode potential is positive with respect to cathode). Such a signal is sometimes called a trigger or gating signal, and it is herein referred to generically as a "firing signal." The controller 44 cyclically produces a series of periodic firing signals for turning on the respective main valves T1–T6 in numerical order. (It is assumed that the alternating voltages developed at the line terminals of the 3-phase stator windings of the machine 14 have the conventional A-B-C phase rotation.) In order to quench or turn off each valve when desired, the inverter has a forced commutation circuit including at least first and second auxiliary controllable electric valves Tp and Tn interconnected in series aiding fashion between the DC terminals 10p and 10n and connected via a commutation capacitor 45 to the stator windings of the machine 14. The capacitor 45 is shunted by a bleeder resistor 46 which effectively keeps the capacitor initially in a substantially discharged state prior to closing the contactors K1p and K1n and starting up the illustrated system. Preferably, the commutation capacitor is connected between the juncture M of the auxiliary valves and the neutral S of the three star-connected stator windings.

The main valves T1–T6 in turn are forced to turn off by the commutation action that is initiated each time one or the other of the auxiliary valves Tp and Tn is turned on. The controller 44 is arranged cyclically to produce a series of periodic firing signals for alternately turning on the two auxiliary valves in synchronism with the variable frequency fundamental component of the sinusoidal phase-to-phase alternating voltages that are developed at the line terminals of the respective phases A,B, and C of the stator windings as the field winding 18 rotates inside the stator of the machine 14. Note that the peak magnitude of reverse voltage imposed on the auxiliary valves can be reduced, if desired, by respectively inserting simple diodes in series therewith.

To produce the valve firing signals at proper times, the controller 44 needs to receive from the power system information or data indicating when the fundamental waveforms of line-to-neutral magnetic flux in the three phases A,B and C of the machine 14 cross zero and change polarity, and indicating the status of the electrostatic charge or voltage on the commutation capacitor 45. Such data are supplied by means of a voltage processor 38 which, as can be seen in FIG. 1, has a plurality of input wires respectively connected to the line terminals of the stator windings and to opposite sides of the capacitor 45. Inside the processor 48 there is bistable first means for sensing the electrical potential difference across the commutation capacitor. Whenever the potential at the juncture M is measurably positive with respect to the neutral S, the first means is in one state and provides a discrete signal (VE1) that is high or "1," but when this potential is measurably negative with respect to neutral the first means is in a different state in which the output signal VE1 is low or "0." voltage sensors suitable for this purpose are well known and readily available to a person skilled in the art. The signal VE1 is supplied over an output bus 50 to the controller 44. An additional bistable voltage sensing means is provided in the voltage processor 48 for detecting whether or not the capacitor voltage has a magnitude exceeding a predetermined level, either positive or negative. In one practical application of the illustrated system, the predetermined level is 400 volts. The additional sensor produces a discrete signal (VE2) on the output bus 50. As the commutation capacitor charges or recharges to a voltage magnitude in excess of the predetermined level, the signal VE2 changes from a "0" to a "1" state.

The voltage processor 48 also includes suitable means for integrating the respective line-to-neutral voltages of the stator windings and for indicating whether the polarity of the integral is positive or negative. The latter means provides three discrete output signals XA, XB and XC which are respectively supplied over lines 51,52 and 53 to the controller 44. The output signal XA is high or "1" only during the half cycles that the time integral of the voltage between the line terminal of phase A and the neutral S is relatively positive. It will be apparent that up and down changes of XA coincide with successive zero crossings of both the magnitude of line-to-neutral flux in phase A and the magnitude of the fundamental phase-to-phase alternating voltage developed at the stator line terminals of phases C and B (i.e., the line terminals to which the AC terminals 13 and 12 of the inverter are respectively connected). Similarly, the output signal XB is "1" only during the half cycles that the integral of the phase B-to-neutral voltage is relatively positive, whereby up and down changes of XB coincide with successive zero crossings of both the magnitude of line-to-neutral flux in phase B and the magnitude of the fundamental phase-A-to-phase-C alternating voltage developed at the stator line terminals to which the AC terminals 11 and 13 are connected. In a similar manner, the output signal XC is "1" only during the positive half cycles of the integral of the phase C-to-neutral voltage, whereby the up and down changes of XC coincide with successive zero crossings of both the magnitude of line-to-neutral flux in phase C and the magnitude of the fundamental phase-B-to-phase-A alternating voltage developed at the stator line terminals to which AC terminals 12 and 11 are respectively connected. By logically processing the resulting output signals XA, SB, and SX, the six different combinations of relative polarities of the three phase-to-phase voltages are indicated during each cycle of operation. Each time the magnitude of any of these voltages crosses zero, a different one of the output signals changes either from 0 to 1 or from 1 to 0.

The controller 44 also communicates with master controls 54 via input and output 55 and 56. A starting switch 57 is associated with the master controls 54. The starting switch 57 can be either a pushbutton type or a turn-and-hold type.

Figure 2:
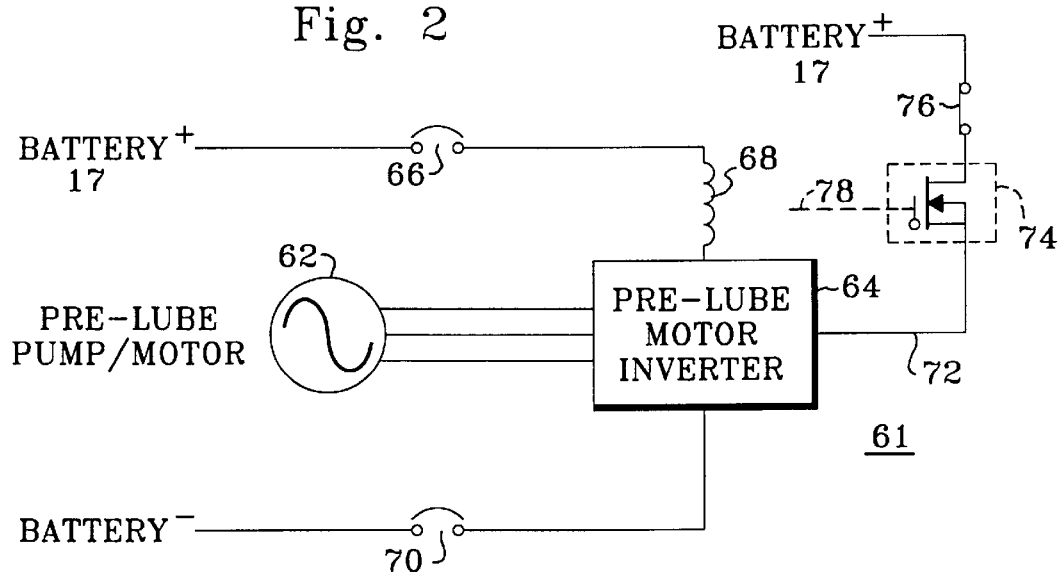
FIG. 2 is a simplified block diagram of power system for a pre-lube pump motor.

FIG. 2 is a simplified schematic/block diagram of an additional inverter power system 61 for a pre-lube motor/pump 62 which is also associated with the power circuit of FIG. 1. The pre-lube system is used to lubricate the engine 16 prior to cranking. The system 61 includes an inverter 64 for supplying control frequency three-phase excitation to a pre-lube pump motor 62. The inverter receives DC power from battery 17 through a first circuit breaker 66 and series inductor 68. A second circuit breaker 70 may be included in the ground return line between the inverter and battery. The inverter 64 is a fixed frequency inverter and may be a commercially available inverter including its own control package for providing signals to the switching devices within the inverter to operate the devices at a fixed frequency. The inverter includes a boost chopper which increases the available battery voltage up to the operating voltage of the motor. In the prior art system of FIG. 2, the inverter produced an AC output voltage of 230 volts for driving the pump motor 62. For this voltage, the boost chopper would increase the battery voltage from its nominal 60 volt value up to 600 volts DC.

The inverter 64 is energized by a start command signal via line 72 which is an output of a pre-lube switch 74 illustrated as a field effect transistor (FET). Power is supplied to the switch 74 through the engine contact start switch 76 from the battery 17. When the engine start switch is actuated, power is available to the FET 74. However, the FET is not actuated until the on-board controller 44 provides a gating signal to the FET 74 via line 78. It will be recognized that the controller 44 monitors various variables to determine whether or not it is appropriate to allow start up of the diesel engine 16. From a consideration of FIG. 1 and FIG. 2, it can be seen that the existing locomotive systems generally use multiple inverters with each inverter being dedicated to a particular function. More particularly, there are a set of inverters which are used to control power being supplied to the electric traction motors of the locomotive, another inverter for enabling excitation of the motor alternator in a motoring mode for cranking the diesel engine, and still another inverter for powering the pre-lube pump motor in order to lubricate the engine prior to cranking. Both of the latter two inverters are seldom used, i.e., only when the engine is initially started. Once the diesel engine has been cranked, it is common practice for the diesel engine to remain running for extended periods of time.

Figure 3:
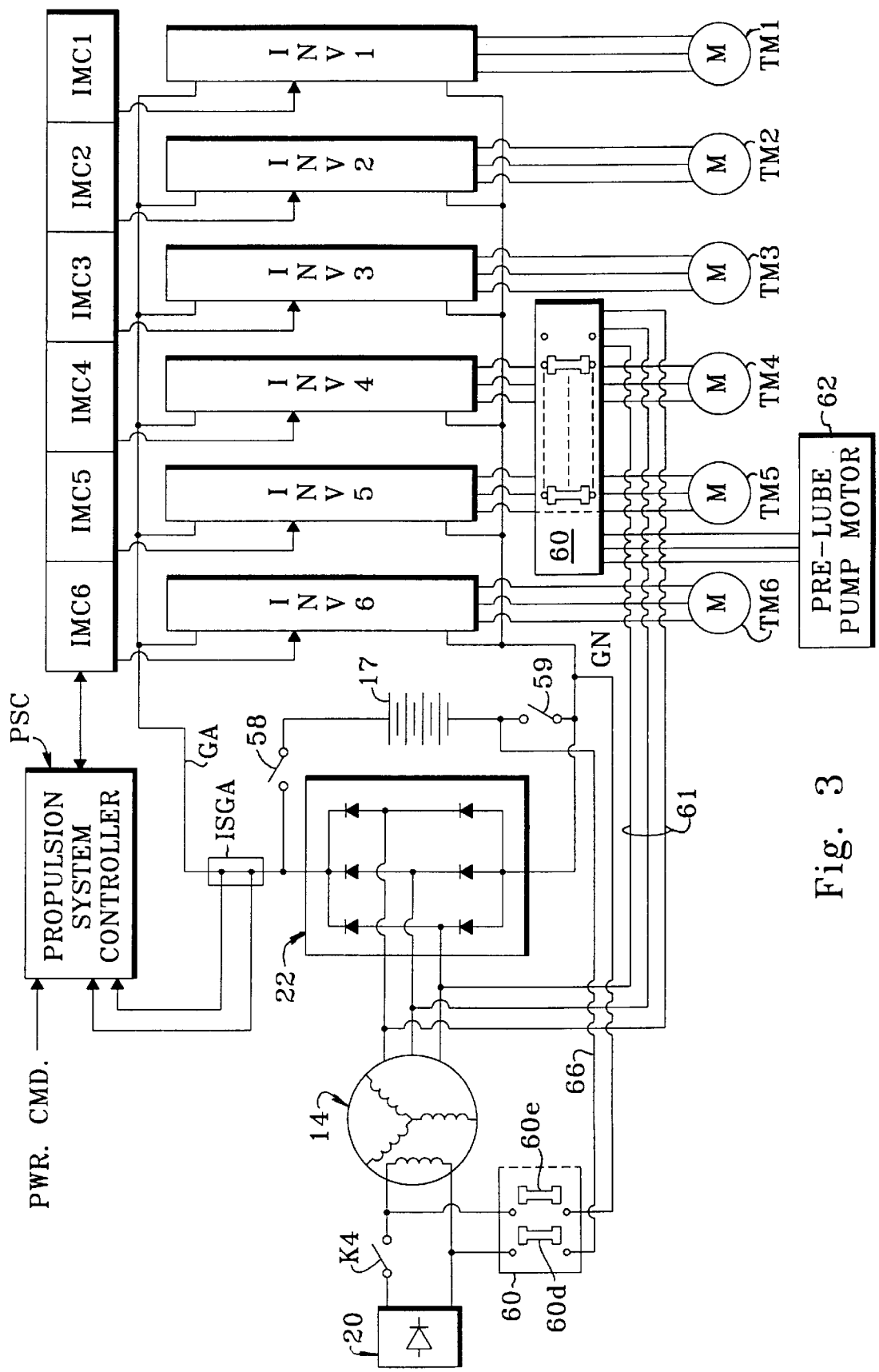
FIG. 3 is a simplified power system for a diesel electric locomotive utilizing AC traction motors and incorporating apparatus for using traction inverters to crank a diesel engine.

Turning now to FIG. 3, in which like reference numbers from FIG. 1 are used to refer to corresponding elements of FIG. 3, there is shown a simplified block diagram of a power system for a diesel electric locomotive of the type using alternating current (AC) electric traction motors. In the illustrated embodiment, the system includes six AC traction motors TM1–TM6. Each traction motor is connected to a corresponding inverter INV1–INV6. Each of the inverters comprises a plurality of controllable electric valves, preferably gate turn-off (GTO) devices, which can be gated into and out of conduction by application of a control signal to their respective gate terminals. The electric valves of each of the inverters is controlled by gate signals supplied by respective inverter controllers IMC1–IMC6, respectively. Each of the inverter controllers is connected to receive signals from a propulsion system controller PSC which provides in response to a power command (PWR CMD) signal as well as various speed and power feedback signals such as those from current sensor ISGA, signals indicative of the desired speed and/or traction effort to be generated by the locomotive. The controllers IMC1–IMC6 operate to provide firing signals to each of the electric valves of the inverters INV1–INV6 using a pulse width modulation technique of a well-known type in order to generate three phase currents in the stator windings of the motors TM1–TM6.

Power to each of the inverters INV1 through INV6 is provided via respective positive and negative DC buses GA and GN, respectively. The bus GA is connected through a current sensor ISGA to a positive voltage output terminal of the main rectifier 22. The negative output terminal of the main rectifier 22 is connected to the bus GN. The onboard locomotive battery 17 is connected between the bus GA and bus GN by respective contactors 58 and 59, although contactor 59 is used only for jogging, i.e., moving the vehicle using battery power.

Power to the main rectifier 22 is supplied from the traction alternator 14 which has its stator windings connected to the 3-phase output lines which are in turn connected to the respective input terminals of the 3-phase, double-way rectifier bridge 22. In the normal motoring mode of operation, the field winding 18 of the traction alternator 14 is energized by electric power from the excitation source 20. The traction alternator thus provides the electric power needed to operate the traction motors and the power is appropriately conditioned by operation of the inverters INV1 through INV6 for application to motors TM1–TM6. For simplification of the drawing, the battery charger circuit and field weakening circuit of FIG. 1 are omitted from FIG. 3.

In the embodiment of FIG. 3, a switching apparatus 60 is provided in the output line of one or more of the inverters INV1–INV6 between the inverter and the corresponding traction motors TM1–TM6. In the illustrated embodiment, the switching apparatus 60 is connected between inverter INV4 and traction motor TM4 and inverter INV5 and traction motor TM5. The switching apparatus 60 is a conventional 3-phase switching device which simultaneously switches three separate lines from inverter INV4 to traction motor TM4 and from inverter INV5 to traction motor TM5. The apparatus 60 may be manual, pneumatic, hydraulically, electric motor or other type of multiphase electrically operated switch. In the normal mode of operation, the switching apparatus 60 is so conditioned that the output lines from inverter INV4 are connected to the stator winding terminals of traction motor TM4 and the output lines of inverter INV5 are connected to the stator winding terminals of traction motor TM5. During cranking operation of the locomotive, the switch apparatus 60 is changed from its normal configuration to one in which the output lines from inverter INV4 or from inverter INV5 are connected to 3-phase output lines 61 which are coupled back to the stator output lines of the traction alternator 14. In this mode, the traction motors TM4 and TM5 are disconnected from their respective inverters. In this cranking mode of operation, the output from either the inverter INV4 or inverter INV5 is supplied on the lines 62 to the stator winding of the traction alternator 14 to effect rotation of the rotor of the machine so that the diesel engine can be cranked. In this manner, the inverters which normally supply power to the motors can be used to crank the diesel engine and thus avoid the need for a separate inverter dedicated to the cranking function. The system of FIG. 3 also provides for multiple inverters for supplying power to the traction alternator 14 although only one inverter at a time may be used. This provides redundancy in the case of an inverter failure. In the prior art system if the cranking inverter had failed, the locomotive was taken out of service. In the system of FIG. 3, if an inverter has failed, another inverter can be used to perform the cranking function.

The switching apparatus 60 also selectively couples the prelube pump motor 62 to output terminals of one of the inverters. As will be described with reference to FIG. 5, in a preferred arrangement, the inverter used to drive the alternator is different from the inverter used to drive the pump motor.

Figure 4:
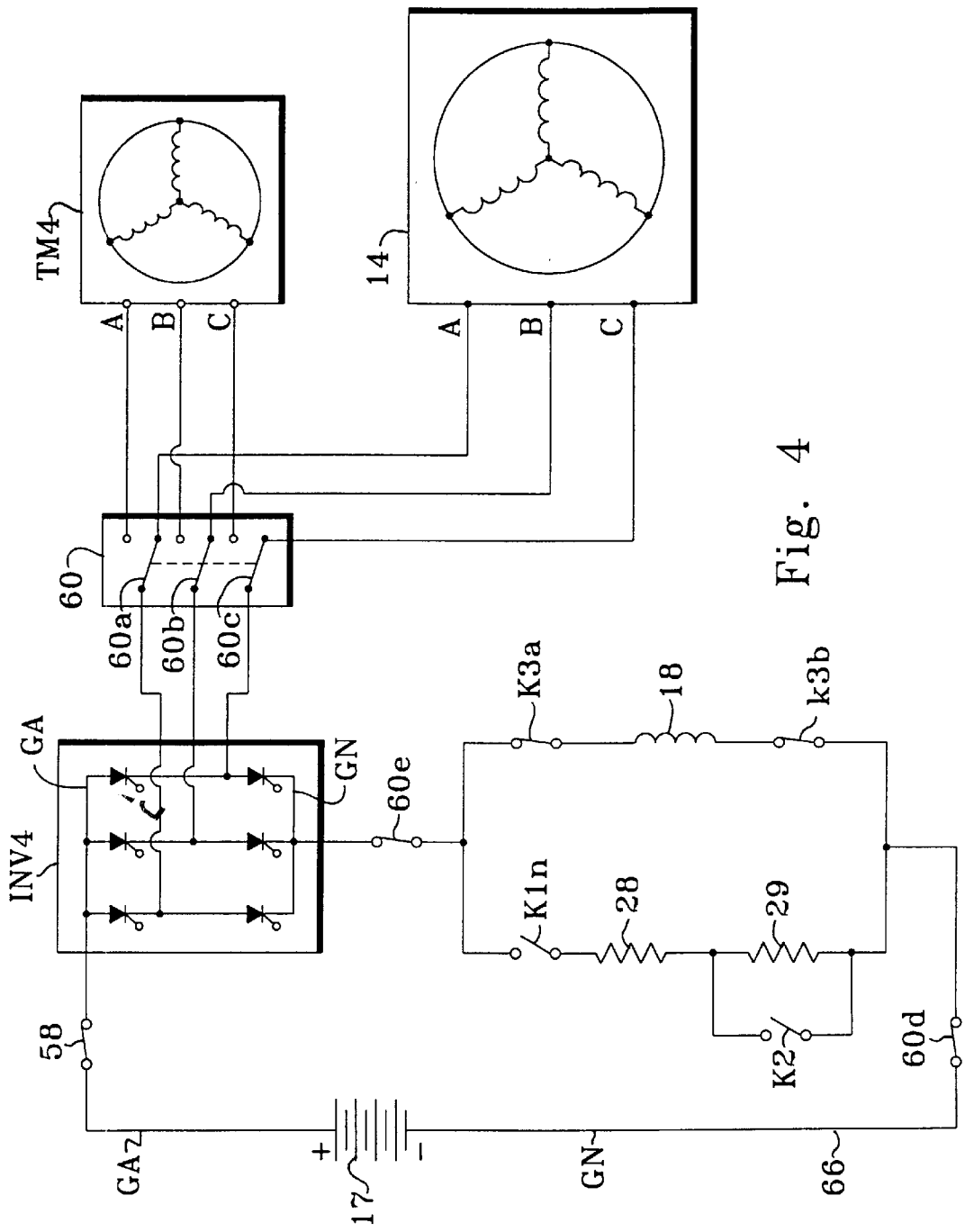
FIG. 4 illustrates the switched connection of the traction motor inverter in form for supplying power for cranking of the locomotive engine.

Turning now to FIG. 4, there is shown a schematic representation of one form of connection of the traction alternator 14 to the output of the inverter INV4. In the cranking mode, the transfer switch 60 is conditioned such that the contact arms 60a,60b and 60c connect the output terminals of inverter INV4 to the respective stator winding terminals of traction alternator 14. Concurrently, the battery switch 58 is closed to connect the positive terminal of the battery 17 to the positive bus GA. The negative side of the battery is connected through a separate contact arm 60d, which is part of the switch 60, via line 66 as shown in FIG. 3 to the negative terminal of traction alternator field 18. Note that with the battery switch 59 opened (see FIG. 3), the inverter INV4 and traction alternator field 18 are connected in series across the battery terminals of battery 17. Since current through inverter INV4 goes through the stator windings of alternator 14, the stator windings and field winding are in series electrical circuit so that the alternator is operated as a series excited motor. The switches K2 and Kln can be used to place the resistors 28 and 29 in parallel with the field 18 for field weakening purposes as described with regard to FIG. 1. Once the engine has been cranked, the transfer switch 60 can be switched to its primary position so that the output of the inverter INV4 is connected to the respective stator terminals of traction motor TM4 and the contacts 60d and 60e opened. Concurrently, the switch K1 can be closed with field current then being supplied from the field excitation source 20. It will be noted that the inverter INV4 utilizes six switching devices connected in a conventional 3-phase rectifier pattern such as was described in regard to the third harmonic rectifier shown in FIG. 1. However, the devices used in the inverter INV4 are preferably gate turn-off devices which eliminate the need for the auxiliary impulse commutation devices utilized in the system of FIG. 1.

Figure 5:
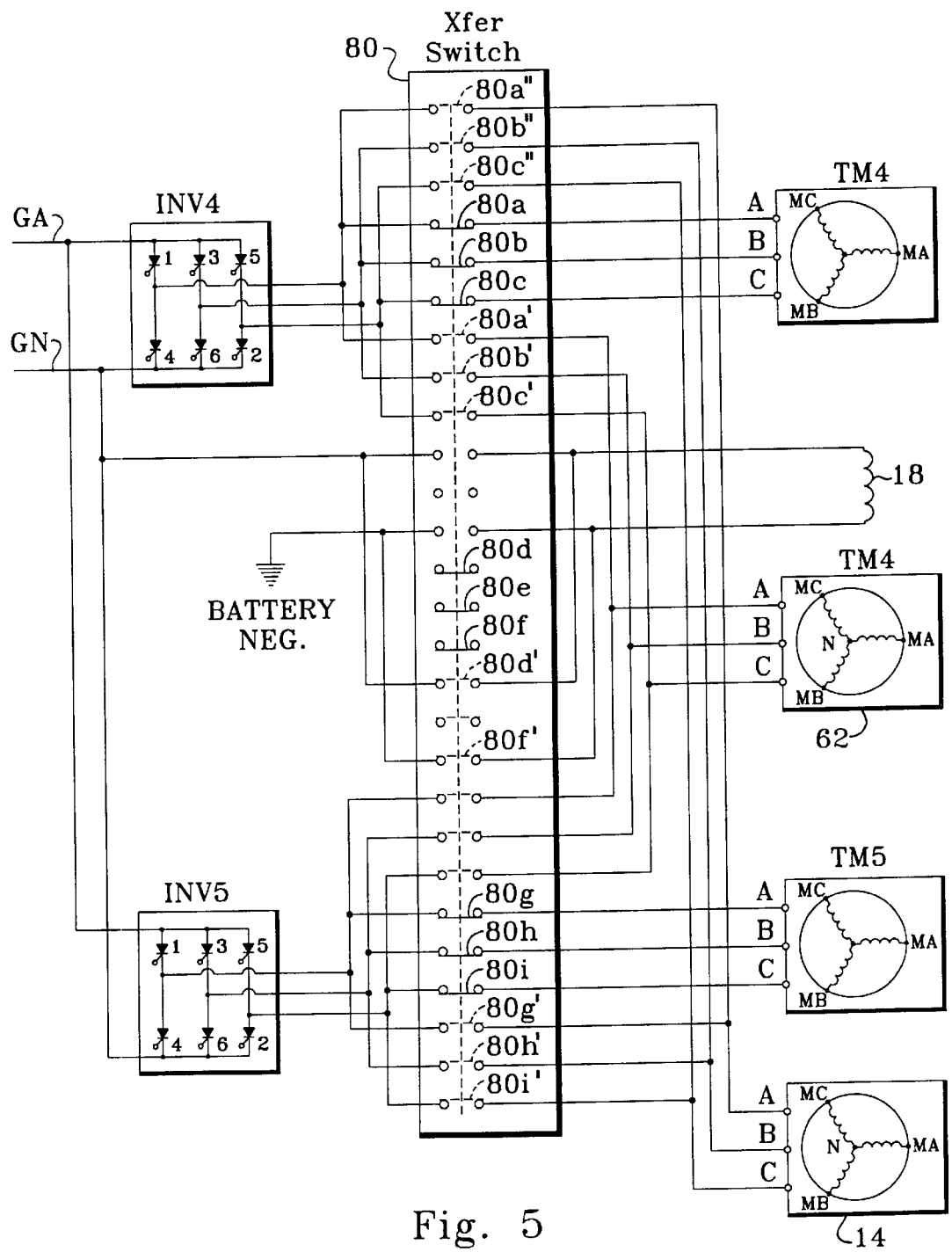
FIG. 5 illustrates an exemplary switching mechanism for allowing use of traction inverters to provide power to multiple disparate systems.

Referring now to FIG. 5, there is shown an illustrative embodiment of a system including a transfer switch 80 incorporating in one system both engine cranking and prelube functions using the traction inverters. In this embodiment, the transfer switch 80 is illustrated as a linear actuation system having a plurality of movable jumpers 80a through 80*i*, arranged in groups of three since the power transfer is all three-phase. In the illustrated position of FIG. 5, the switch 80 contacts 80*a*, 80*b* and 80*c* connect the output terminals of inverter INV4 to the respective stator terminals of traction motor TM4. Concurrently, the switch 80 contacts 80*g*, 80*h* and 80*i* connect the output terminals of inverter INV5 to the stator terminals of traction motor TM5. Switch 80 contacts 80*d*, 80*e* and 80*f* are positioned across open terminals. During start-up operation, the switching mechanism (three groups of three jumpers each) of switch 80 can be moved to either a fully up or fully down position (in the FIG. 5 orientation) depending on whether it is desirable to use traction inverter INV4 or traction inverter INV5 to supply power to the traction alternator 14 or the pre-lube pump motor 62. In the down position, the traction inverter INV5 terminals are connected to supply power to pump motor 62 as shown by the phantom connecting lines 80*a*, 80*b*, 80*c*. The down position also places the switch elements 80*d*, 80*e* and 80*f* such that the traction alternator field 18 is connected to the battery buses GA and GN as shown by the phantom connecting contact lines 80*d*, 80*f*. Additionally, the jumpers 80*g*, 80*h*, and 80*i* are shifted downward so that the output terminals of inverter INV5 are coupled to the three-phase power input terminals of traction alternator 14 as indicated by contacts 80*g*, 80*h* and 80*i*. The controller 44 can now energize inverter INV4 to initially supply power to pre-lube pump motor 62 for a predetermined time interval so as to circulate lubricant through engine 16. Thereafter, the inverter INV4 is disabled (gating signals terminated) and inverter INV5 enabled so that power is now applied to traction alternator 14 to operate it as a motor and crank engine 16. Once the engine starts, transfer switch 80 is returned to the initial condition shown in FIG. 5 whereby power is supplied to the traction motors.

If the transfer switch 80 is operated to shift the switching elements 80*a* through 80*i* in an upward direction, the output terminals of the traction inverter INV4 are connected to the stator winding terminals of traction alternator 14 while the output terminals of inverter INV5 are connected to the pre-lube pump motor 62. At the same time, the switch elements 80*d* and 80*f* move upward so that the traction alternator field is connected in series circuit with the inverter INV4. Thus, the transfer switch 80 can be operated to utilize one of the traction inverters INV4 or INV5 to supply power to the traction alternator for cranking purposes while the other inverter is used for powering the pre-lube pump motor. The mechanism thus provides redundancy in the event of a failure of a traction inverter. It will be recognized that the use of inverters INV4 and IN5 is for illustrative purposes only and the system can be connected to use any combination of inverters. It will also be apparent that a failure of one inverter, e.g., inverter INV4, can be overcome by setting the transfer switch 80 to use inverter INV5 for pre-lube motor excitation and then resetting the switch to use the same inverter for cranking.

Although the invention is disclosed in a form in which the synchronous generator or alternator 14 is connected in the form of a series motor during cranking, i.e., the field winding 18 is in series with the stator windings, it will be apparent that the switch 80 could be adapted to connect, for example, inverter INV5 to the stator windings and concurrently connect the inverter INV4 to supply power to excitation source 20. The excitation source 20 preferably includes a rectifier circuit for normally supplying DC power to field winding 18. Inverter INV4 could supply regulated power to such rectifier and thereby allow alternator 14 to be operated in a separately excited mode.

While the invention has been described in what is presently considered to be a preferred embodiment, various modifications and improvements will become apparent to those skilled in the art. Further, while the invention is disclosed in the environment of a diesel-electric locomotive, it will be apparent that the invention can be applied to other internal combustion engine powered electric traction motor vehicles such as off-highway vehicles of the type used in the mining industry as well as other applications using similar type propulsion or power systems. It is intended therefore that the invention not be limited to the specific disclosed embodiment but be interpreted within the full spirit and scope of the appended claims.

What is claimed is:

1. In a locomotive having a plurality of alternating current (AC) electric traction motors each coupled in driving relationship to a respective one of a plurality of driven wheels of the locomotive, each of the traction motors having excitation windings coupled in circuit with a corresponding one of a plurality of power inverters, the inverters each having a plurality of controllable electric valves for supplying controlled frequency electric power to the corresponding motor by inversion of direct current (DC) power supplied to input terminals of the inverter, the DC power being obtained from rectification of AC power generated at stator winding terminals of an alternator having a rotor connected to be rotatably driven by an internal combustion engine, the locomotive including a battery for supplying power for cranking the engine and for energizing a pre-lube pump motor for lubricating the engine prior to cranking, the improvement comprising:

first switching means for coupling the input terminals of at least one of said plurality of inverters in electric circuit arrangement for receiving DC electric power from the battery;

second switching means selectively conditionable for coupling the output terminals of at least one of said plurality of inverters to respective ones of the stator winding terminals of the alternator and to excitation windings of the corresponding AC electric traction motor, said second switching means being operable to selectively switch said power inverters into circuit arrangement with the alternator stator windings for supplying power to drive the alternator in a motoring mode for cranking the engine;

third switching means selectively conditionable for coupling the output terminals of another of said plurality of inverters to respective ones of the input terminals of the pre-lube pump motor;

control means for first energizing the electric valves of said another of said inverters for energizing said pump motor and lubricating said engine, for subsequently de-energizing said another inverters and thereafter energizing the electric valves of said at least one of said plurality of inverters to supply variable frequency excitation to the alternator stator windings for effecting rotation of the rotor thereof and concurrent rotation of the drive shaft of the engine for cranking of the engine when said second means is conditioned for selectively coupling the inverters to the stator winding terminals of the alternator; and each of said first, second and third switching means being operative to connect output terminals of said at least one and another of said inverters to corresponding input terminals of respective ones of said traction motors.

2. The improvement of claim 1 wherein the electric valves of the inverter comprise gate turn-off switching devices.

3. The improvement of claim 1 wherein said first, second and third switching means comprises an electrically operated multigang switch.

4. The improvement of claim 1 wherein the alternator includes a field winding and said first switching means is operable for coupling said alternator field winding in series electrical circuit with said at least one power inverter and the battery.

5. The improvement of claim 4 and including means coupled in circuit with said alternator field winding for adjusting current in said alternator field winding.

6. The improvement of claim 4 wherein said second switching means is operable in a first cranking mode for coupling a first one of said inverters into power supplying arrangement with said stator windings of said alternator and operable in a second cranking mode for coupling a second one of said inverters into power supply arrangement with said stator windings of said alternator.

7. A method for cranking and operating an internal combustion engine in a locomotive having a plurality of alternating current (AC) electric traction motors each coupled in driving relationship to a respective one of a plurality of driven wheels of the locomotive, each of the traction motors having excitation windings coupled in circuit with a corresponding one of a plurality of power inverters, each AC motor being powered from the corresponding inverter, the inverters each having DC input terminals connected between relatively positive and negative DC buses, the DC buses being connected to DC output terminals of a rectifier, the rectifier having AC input terminals connected to stator terminals of a synchronous generator, the generator including a field winding and a rotor connected in driving relationship to a crank shaft of the engine, the vehicle further including a battery selectively connectable to the positive and negative DC buses and a pre-lube pump motor for pumping lubricant into the engine prior to cranking, the method comprising the steps of:

disconnecting one of the inverters from the corresponding one of the AC motors and selectively connecting the one of the inverters to supply power to the pre-lube pump motor;

disconnecting another of the inverters from the corresponding one of the AC motors and selectively connecting the another of the inverters to supply power to the generator by connecting the field winding of the generator into a series circuit with the battery and the DC input terminals of the another of the inverters; and operating the one and another of the inverters in sequence to initially lubricate the engine and thereafter to energize the generator whereby the generator operates in a motoring mode to rotate the engine crank shaft to start the engine.

8. The method of claim 7 wherein the step of connecting the field winding includes the steps of connecting a positive voltage terminal of the battery to the positive DC bus, connecting one terminal of the generator field winding to a negative voltage terminal of the battery and connecting another terminal of the field winding to the negative voltage bus with the battery negative voltage terminal disconnected from the negative voltage bus.

* * * * *